(12) United States Patent
Lee et al.

(10) Patent No.: US 9,111,185 B2
(45) Date of Patent: Aug. 18, 2015

(54) METHOD AND APPARATUS TO MANAGE CONTENTS IN NETWORK AND WEB SERVER USED THERETO

(75) Inventors: Sang-Gyu Lee, Seoul (KR); Suk-Joo Lee, Yongin-si (KR); Yoon-Ho Jeon, Seoul (KR)

(73) Assignee: Neolab Convergence, Inc., Seoul (KR)

(*) Notice: Subject to any disclaimer, the term of this patent is extended or adjusted under 35 U.S.C. 154(b) by 83 days.

(21) Appl. No.: 13/809,054

(22) PCT Filed: Jul. 6, 2011

(86) PCT No.: PCT/KR2011/004943
§ 371 (c)(1),
(2), (4) Date: Mar. 20, 2013

(87) PCT Pub. No.: WO2012/005508
PCT Pub. Date: Jan. 12, 2012

(65) Prior Publication Data
US 2013/0168452 A1    Jul. 4, 2013

(30) Foreign Application Priority Data
Jul. 8, 2010  (KR) .................. 10-2010-0065715

(51) Int. Cl.
| G06K 7/10 | (2006.01) |
| G06K 19/06 | (2006.01) |
| G06F 17/30 | (2006.01) |
| G06Q 10/10 | (2012.01) |

(52) U.S. Cl.
CPC .......... *G06K 19/06* (2013.01); *G06F 17/30091* (2013.01); *G06K 7/10544* (2013.01); *G06Q 10/10* (2013.01)

(58) Field of Classification Search
USPC ............. 235/462.01, 462.13, 375, 380, 462.1
IPC .................. G06K 7/14,7/1417, 17/00, 7/10693, G06K 7/10851; G06Q 30/02, 20/341; G07F 7/1008
See application file for complete search history.

(56) References Cited

U.S. PATENT DOCUMENTS

| 2005/0182651 A1* | 8/2005 | McIntyre et al. ................. 705/1 |
| 2007/0007279 A1* | 1/2007 | Chun et al. .................... 219/506 |
| 2011/0288962 A1* | 11/2011 | Rankin et al. ................ 705/27.1 |
| 2012/0302312 A1* | 11/2012 | Katz et al. ....................... 463/17 |
| 2014/0143889 A1* | 5/2014 | Ginter et al. .................... 726/27 |

FOREIGN PATENT DOCUMENTS

| KR | 10-2004-0079625 | 9/2004 |
| KR | 10-0597658 | 7/2006 |
| KR | 10-2007-0058867 | 6/2007 |

* cited by examiner

*Primary Examiner* — Karl D Frech
(74) *Attorney, Agent, or Firm* — NSIP Law

(57) ABSTRACT

A method and apparatus are provided to manage contents in a network, and a web server used thereto. A memory is configured to store a code output with a printed matter and mapping information of contents, which are executed by a reader reading the code. A receiver is configured to receive a request from the reader to transmit the mapping information. A transmitter is configured to transmit the mapping information to the reader. When the code outputted to the printed matter is read, the contents executed in the reader are changed into various contents such that the changed contents are used. In addition, a product user and a product seller obtain the learning information of a learner through the reader, or product application information.

18 Claims, 2 Drawing Sheets

METHOD AND APPARATUS TO MANAGE CONTENTS IN NETWORK AND WEB SERVER USED THERETO

CROSS-REFERENCE TO RELATED APPLICATION(S)

This application is a National Phase entry of PCT Application No. PCT/KR2011/004943, filed on Jul. 6, 2011, which claims priority under 35 U.S.C. §119(e), 120 and 365(c) to Korean Patent Application No. 10-2010-0065715, filed on Jul. 8, 2010, in the Korean Intellectual Property Office.

BACKGROUND

1. Field

The following description relates to a method, web server using the same, and an apparatus to manage contents in a network and a web server used thereto, and more particularly, to a method and an apparatus to manage contents in a network to enable a user to use various contents by changing the contents a reader executes into the various contents when the reader reads out a code from a printed matter, and to enable a product user and a product seller to obtain learning information from the reader, or obtain product application information.

2. Description of Related Art

Recently, a printed matter product has been widely utilized to teach, in which, when a code-printed portion on a printed matter is scanned by the reader having a pen shape, a voice file previously stored in a reader is reproduced as contents corresponding to read-out codes. The printed matter may include an educative booklet on which invisible codes are printed.

However, a study system using the printed matter having the codes according to the related art represents limitations in that only the contents stored in the reader are executed and a product user. Also, a product seller cannot obtain through the reader learning information from a learner, such as the learning contents or product application information.

SUMMARY

In accordance with an illustrative example, a method and apparatus are provided to manage contents in a network to enable a reader to use various contents by changing the contents the reader executes into the various contents when the reader reads out a code from a printed matter, and to enable a product user and a product seller to obtain the learning information of a student or learner through the reader, or obtain product application information, and a web server using the same.

In accordance with an illustrative example, there is provided a method to manage contents in a network, the method including storing a code output with a printed matter and mapping information about the contents, which are executed by a reader reading the code; receiving a request from the reader to transmit the mapping information in the web server; and transmitting the mapping information from the web server to the reader.

The method includes receiving from the reader contents execution information including information about the executed contents in the web server when the reader reads the code output with the printed matter and executes contents corresponding to the code according to the mapping information.

The method also includes transmitting the contents execution information from the web server to a server of a seller of the reader.

The code output with the printed matter is assigned by a code management server such that the code is not redundantly output with other printed matters.

In accordance with an illustrative example, there is provided a computer program embodied on a non-transitory computer readable medium, configured to control a processor to perform the method described above.

In accordance with an illustrative example, there is provided an apparatus including a memory configured to store a code output with a printed matter and mapping information of contents, which are executed by a reader reading the code; a receiver configured to receive a request from the reader to transmit the mapping information; and a transmitter configured to transmit the mapping information to the reader.

The receiver receives from the reader contents execution information including information about the executed contents when the reader reads the code output with the printed matter and executes the contents corresponding to the code according to the mapping information.

The transmitter transmits the contents execution information to a server of a seller of the reader.

The code output with the printed matter is assigned by a code management server such that the code is not redundantly output with other printed matters.

In accordance with an illustrative example, there is provided a reader configured to read a printed matter, including a memory configured to store mapping information downloaded from a web server, wherein the mapping information includes content information, each content information associated with a corresponding code, which includes a unique identifier that has not been used for any previous printed matters; and a processor reading the printed matter and a code corresponding to the printed matter, and executing content information associated with the code in the mapping information matching the code from the printed matter, and transmitting contents execution information, which includes information about at least one of the executed content information, contents execution time, a product serial number of the reader to a web server.

The contents execution information are transmitted to the seller server at predetermined time periods.

The code includes a bar code, a dot code, or a line code.

The code output with the printed matter is uniquely assigned where the code is not repeated with other printed matters.

In accordance with an illustrative example, there is provided a method configured to read a printed matter, including storing mapping information downloaded from a web server, wherein the mapping information includes content information, each content information associated with a corresponding code, which includes a unique identifier that has not been used for any previous printed matters; reading the printed matter and a code corresponding to the printed matter; executing content information associated with the code in the mapping information matching the code from the printed matter; and transmitting contents execution information, which includes information about at least one of the executed content information, contents execution time, a product serial number of the reader to a web server.

The contents execution information are transmitted to the seller server at predetermined time periods.

The code includes a bar code, a dot code, or a line code.

The code output with the printed matter is uniquely assigned where the code is not repeated with other printed matters.

In accordance with an illustrative example, there is provided a computer program embodied on a non-transitory computer readable medium, configured to control a processor to perform the method described above.

Figure 1:
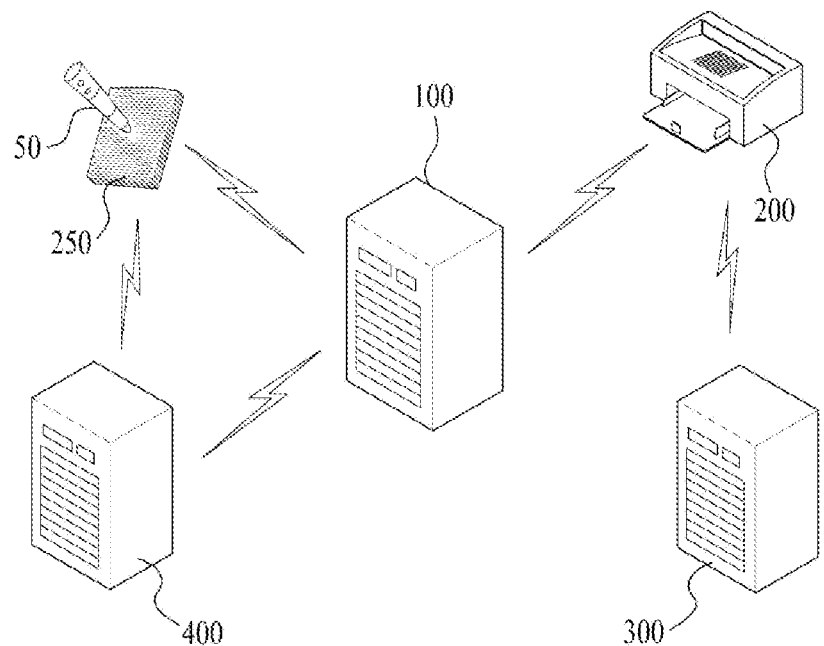
FIG. 1 is a view showing a configuration of a system including an apparatus to manage contents in a network according to an illustrative example.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a view showing a configuration of a system including an apparatus to manage contents in a network, according to an illustrative example. A reader 50 is configured to read out a code from a printed matter 250. The reader 50 may be configured as a pen reader including a light source and photodiode that are placed next to each other in the tip of a pen or wand. The printed matter 250 may include, but it is not limited to printed material produced by printers or publishers, such as books, magazines, booklets, brochures and other publicity materials and newspapers. According to an illustrative example, a code is a descriptor or identifier of various types including, but not limited to, a bar code, a dot code, or a line code.

Referring to FIG. 1, the system for managing contents in a network according to an illustrative example includes a web server 100, a printed-matter producing apparatus 200, a code management server 300, and a seller server 400.

When the code managing server 300 receives a request to produce a printed matter from an outside source or external administrator terminal (not shown), the code managing server 300 assigns a code to the requested printed matter 250. The code is a unique code, descriptor, or identifier that has not been used for any previous printed matters to avoid redundantly using the same code in mutually different printed matters. The code managing server 300, through a wired or wireless connection, transmits the assigned code to the printed-matter producing apparatus 200.

The printed-matter producing apparatus 200 produces or prints the printed matter corresponding to the assigned code from the code management server 300. Once the producing of the printed matter is completed, the printed-matter producing apparatus 200 transmits, through a wired or wireless connection, printed-matter producing information to the code management server 300.

The web server 100 serves as a server to manage contents according to an illustrative example. In one configuration, the web server 100 stores mapping information of contents that are executed by the reader 50. The reader 50 reads out a code from the printed matter and requests the web server 100 to transmit the mapping information corresponding to the code. In response, the web server 100 transmits the requested mapping information to the reader 50.

In addition, when the reader 50 reads out the code from the printed matter and executes the contents corresponding to the code, the reader 50 transmits contents execution information including the information about the executed contents to the web server 100. After storing the contents execution information received from the reader 50, the web server 100 transmits the stored contents execution information, at predetermined intervals, to the seller server 400 which is operated by a seller who sold the reader 50 to the user.

Meanwhile, the contents executed by the reader 50 are stored in the seller server 400 of the seller. The seller regularly updates the contents. Thus, the user is enabled to access the seller server 400 through the reader 50 to search for desired contents and download the desired contents to the reader 50.

In addition, the seller server 400 provides device-driver download and customer-support service functions for using the reader 50 sold to the user.

Figure 2:
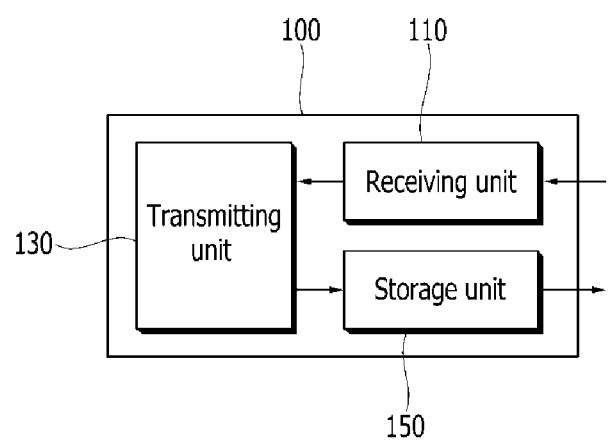
FIG. 2 is a block diagram showing a web server used to manage contents in a network according to an illustrative example.

FIG. 2 is a block diagram showing a web server apparatus used to manage contents in a network, according to an illustrative example. Referring to FIG. 2, the web server 100 used to manage contents includes a receiver or receiving unit 110, a memory or storage unit 130, and a transmitter or a transmitting unit 150.

The receiving unit 110 of the web server 100 receives a request from the reader 50 to transmit the mapping information from the reader 50. The receiving unit 110 also receives from the reader 50 the contents execution information including the information about the contents executed by the reader 50.

The storage unit 130 of the web server 100 stores the mapping information of the contents execution information the reader 50 executed. A previously stated, the reader 50 reads out contents execution information printed on the printed matter and a corresponding code. In addition, the storage unit 130 of the web server 100 stores the request to transmit the mapping information and the contents execution information received at the receiving unit 110.

Furthermore, the transmitting unit 150 of the web server 100 transmits the mapping information stored in the storage unit 130 to the reader 50 and the contents execution information to the seller server.

Figure 3:
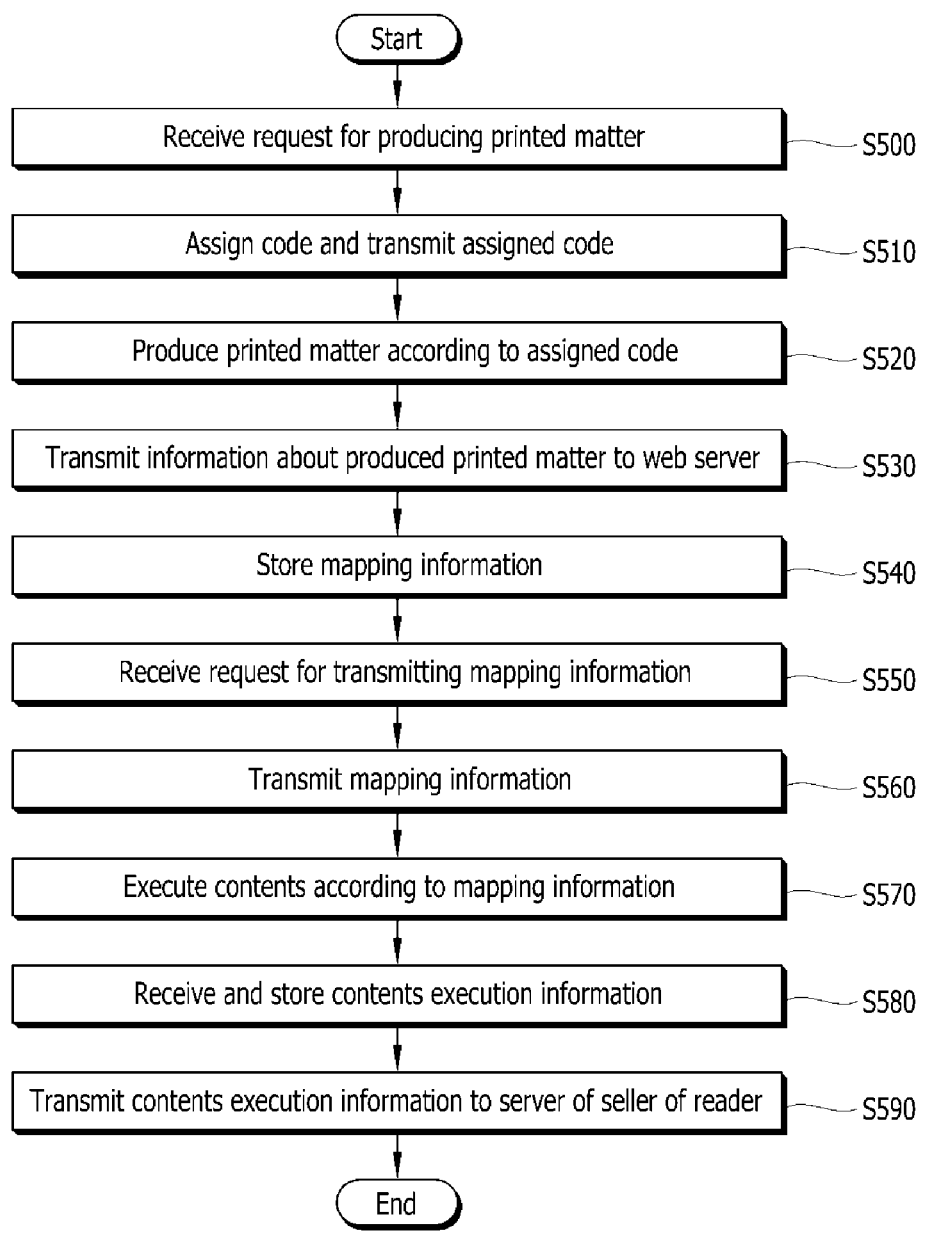
FIG. 3 is a flowchart illustrating managing method to manage contents in a network according to an illustrative example.

FIG. 3 is a flowchart illustrating a managing method to manage contents in a network according to an illustrative example. The operational principle of the system to manage contents in a network, according to an illustrative example, will be described with reference to FIGS. 1 to 3. At S500, the code management server 300 receives a request to produce a printed matter from an external administrator terminal (not shown).

The information about a code previously assigned to a printed matter 250 is stored in the code management server 300. At S510, in response to receiving the request, the code management server 300 assigns a code to the requested printed matter 250. The code management server 300 excludes the codes that have been assigned to any previous printed matters to prevent the same code from being redundantly assigned. Then, the code management server 300 transmits the assigned code to the printed-matter producing apparatus 200.

At S520, the printed-matter producing apparatus 200 receives the code assigned to the printed material from the code management server 300, and produces the printed matter 250, such as a teaching material to which the code is assigned. The produced printed matter 250 is transferred to the reader 50.

Also, the printed-matter producing apparatus 200 produces the printed matter with the assigned code, and transmits the printed-matter producing information to the code management server 300. The printed-matter producing information includes, but is not limited to, information of a kind, a price or a standard of the printed matter. The code management server 300 updates and stores the information about the codes which have been previously assigned and output to the printed matters based on the printed-matter producing information received from the printed-matter producing apparatus 200.

At S530, the printed-matter producing apparatus 200 transmits the printed-matter producing information to the web server 100 and to the code management server 300. At S540, the web server 100, which receives the printed-matter producing information, stores in the storage unit 130 a mapping table that maps the information about the contents corresponding to the codes output to the printed matters. Table 1 illustrates an example of the mapping table.

TABLE 1

| Serial No. | Code Information | Contents Information |
| --- | --- | --- |
| 1 | 00 | Bird_song_sound.mp3 |
| 2 | 01 | Sea_image.avi |
| 3 | 10 | Water_stream_sound.mp3 |
| 4 | 11 | Eiffel_tower_image.avi |

In one example as shown in Table 1, if the code information read out by the reader 50 is '00', the reader 50 executes the content having the file name of 'Bird_song_sound.mp3'. If the code information read out by the reader 50 is '01', the reader 50 executes the content having the file name of 'Sea_image.avi'.

Furthermore, a user who purchases the reader 50 from a distributer may access the seller server 400 through the reader 50 to download the contents including 'Bird_song_sound.mp3', 'Sea_image.avi', 'Water_stream_sound.mp3', and 'Eiffel_tower_image.avi', which are uploaded from the seller server 400 to the memory of the reader 50.

At S550, the reader 50 accesses the web server 100 by requesting a transmission of the mapping information as denoted in Table 1. The receiving unit 110 of the web server 100 receives the request to transmit the mapping information. At S560, the web server 100 transmits the mapping information stored in the storage unit 130 to the reader 50 through the transmitting unit 150.

The reader 50 stores the mapping information downloaded from the web server 100 in a memory. Then, as the user reads the printed matter 250 using the reader 50, the reader 50 also reads out a code from the printed matter 250, on which the code or code information, such as '00', '01', '10', or '11' is printed. According to an illustrative example, various types of codes such as a bar code, a dot code, or a line code may be used as the code.

When the code read out by the reader 50 has the code information of '00', the reader 50 executes the contents having the file name of 'Bird_song_sound.mp3', which are stored in the reader 50 and correspond to the mapping information stored in the memory. The contents are downloaded from the seller server 400.

In one illustrative example, a bird picture may be drawn together with the code on the portion of the printed matter on which the code is printed. At S570, when the user allows the reader 50 to scan the bird picture, the reader 50 executes the contents having the file name of 'Bird_song_sound.mp3', so that the user hears a bird song sound.

That is, because the contents executed by the reader 50 are determined based on the mapping table stored in the web server 100 as described above, the contents executed by the same printed matter 250 may be modified, in one example, by changing the mapping table of the web server 100.

Thus, if the contents are executed through the reader 50 according to the mapping information, the reader 50 transmits the contents execution information, which includes information about the executed contents, the contents execution time, the product serial number of the reader 50, etc., to the web server 100. At S580, the receiving unit 110 of the web server 100 receives the contents execution information and stores the contents execution information in the storage unit 130 of the web server.

At S590, the web server 100 transmits the contents execution information to the seller server 400 at predetermined time periods.

Thus, an administrator of the seller server 400 may obtain information about the contents executed by each reader 50 and the execution time and frequency of the contents, and may analyze the information about the application states of the reader 50 and various contents to utilize an analysis result as basic data for developing the reader 50 in the future.

In addition, a website provided by the seller server 400 may display the information about the contents executed by each reader 50 and the execution time and frequency of the contents, thereby enabling purchasers of the readers 50 to identify the application states of their readers 50.

That is, in one example, parents who provide the reader 50 as a learning tool to their children may obtain the information by accessing the website. The information may include the time, the type of contents, and the frequency of the contents used by their children. Thus, a parent may check study state of their children and effectively plan education schedules in advance.

One of the many advantages provided by the various configurations described above include using the various contents by changing the contents executed in the reader into the various contents when the reader reads out the codes from the printed matter.

In addition, a product user and a product seller can obtain through the reader the learning information from a learner, such as learning contents or obtain product application information.

The units described herein may be implemented using hardware components. For example, processors, processing devices, controllers, microphones, amplifiers, band-pass filters, audio to digital converters, and processing devices. A processor, processing device, and/or controller may be implemented using one or more general-purpose or special purpose computers, such as, for example, an arithmetic logic unit, a digital signal processor, a microcomputer, a field programmable array, a programmable logic unit, a microprocessor or any other device capable of responding to and executing instructions in a defined manner. The processor, processing device, and/or controller may run an operating system (OS) and one or more software applications that run on the OS. The processor, processing device, and/or controller also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processor, processing device, and/or controller may include multiple processors or a processor and a controller. In addition, different processing configurations are possible, such a parallel processors.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Program instructions to perform a method described herein, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method to manage content file in a network, the method comprising:
    storing, in a computer memory, a code printed in a printed matter, and mapping information to a content file related to the printed matter, wherein the content file is configured to be executed by a reader device, as a result of reading the code;
    receiving, in the web server, a request from the reader device, to transmit the mapping information; and
    transmitting the mapping information from the web server to the reader device.

2. The method of claim 1, further comprising:
    receiving, from the reader device content file execution information, comprising information in the web server related to the executed content file, when the reader device reads the code printed in the printed matter, and executes content file corresponding to the code according to the mapping information.

3. The method of claim 2, further comprising:
    transmitting the content file execution information from the web server to a server of a vendor of the reader device.

4. The method of claim 1, wherein the code printed in the printed matter is assigned by a code management server such that the code is not redundantly printed in other printed matters.

5. An device comprising:
    a computer memory configured to store a code printed in a printed matter, and mapping information to a content file related to the printed matter, wherein the content file is configured to be executed by a reader device, as a result of reading the code;
    a receiver configured to receive a request, from the reader device, to transmit the mapping information; and
    a transmitter configured to transmit the mapping information to the reader device.

6. The device of claim 5, wherein the receiver is configured to receive, from the reader device, content file execution information comprising information related to the executed content file, when the reader device reads the code printed in the printed matter and executes the content file of the printed matter corresponding to the code according to the mapping information.

7. The device of claim 6, wherein the transmitter is configured to transmit the content file execution information to a server of a vendor of the reader device.

8. The device of claim 5, wherein the code printed in the printed matter is assigned by a code management server such that the code is not redundantly printed in other printed matters.

9. A computer program embodied on a non-transitory computer readable medium, configured to control a processor to perform the method of claim 1.

10. A reader device configured to read a printed matter, comprising:
    a computer memory configured to store mapping information downloaded from a web server, wherein the mapping information comprises a content file, each content file associated with a corresponding code, the corresponding code comprising a unique identifier that has not been used for any previous printed matters; and
    a processor configured to read the printed matter and a code corresponding to the printed matter, to execute a content file associated with the code in the mapping information, that matches the code from the printed matter, and to transmit content file execution information to a web server, the content file execution information comprising information including at least one of: the executed content file, content file execution time, and a product serial number of the reader device.

11. The reader device of claim 10, wherein the content file execution information is transmitted to the server of a vendor at predetermined time periods.

12. The reader device of claim 10, wherein the code comprises at least one of a bar code, a dot code, or a line code.

13. The reader device of claim 10, wherein the code printed in the printed matter is uniquely assigned, such that the code is not repeated with other printed matters.

14. A method configured to read a printed matter, comprising:
- storing mapping information downloaded from a web server, wherein the mapping information comprises a content file, each content file associated with a corresponding code, the code comprising a unique identifier that has not been used for any previous printed matters;
- reading, using a reading device, the printed matter and a code corresponding to the printed matter;
- executing, using the reading device, a content file associated with the code in the mapping information, the code in the mapping information matching the code from the printed matter; and
- transmitting, using the reading device, content file execution information to a web server, the content file execution information comprising information including at least one of: the executed content file, content file execution time, and a product serial number of the reader device.

15. The method of claim 14, wherein the content file execution information is transmitted to a server of a vendor at predetermined time periods.

16. The method of claim 14, wherein the code comprises at least one of a bar code, a dot code, and a line code.

17. The method of claim 14, wherein the code printed in the printed matter is uniquely assigned, such that the code is not repeated with other printed matters.

18. A computer program embodied on a non-transitory computer readable medium, and configured to control a processor to perform the method of claim 14.

* * * * *